Sept. 3, 1929.                P. H. BUCH                1,727,046
                              WORM GEAR
                           Filed Jan. 10, 1928

Inventor:
Paul H. Buch,
by Syrn Middleton Donaldson & Hall
Attys.

Patented Sept. 3, 1929.

1,727,046

UNITED STATES PATENT OFFICE.

PAUL H. BUCH, OF NEW YORK, N. Y., ASSIGNOR OF ONE-HALF TO HOWARD M. GROFF, OF PLAINFIELD, NEW JERSEY.

WORM GEAR.

Application filed January 10, 1928. Serial No. 245,710.

My said invention relates to worm gears of the type having means for preventing back lash, and has, among its objects, the following:

1st. To provide a construction which will permit low cost of manufacture and be strong, durable and efficient in use.

2nd. To provide means for ready and accurate adjustment without necessity of disassembly.

3rd. To provide a worm having a greater throat angle and split or divided at such a point as to leave the teeth on the main member as strong and with as much working surface as the conventional solid gear.

4th. To provide a construction having two pointed adjusting screws on one part cooperating with cam lugs on the other part, disposed on opposite sides of the axis of the gear.

5th. To provide means for accurately registering and holding the two parts during the cutting of the teeth and to hold the parts of the finished gear clamped firmly together during use, whereby strain on the adjusting means is relieved, and 6th. To provide a construction in which the toothed portion of the worm will overhang the shaft bearing so as to be in line therewith.

With these and other objects in view, the invention includes the novel features of construction and arrangement and combination of parts hereinafter described, the said invention being defined and ascertained by the claims appended hereto.

In order that the invention may be more readily understood, reference is made to the accompanying drawings, in which.

Figure 1:
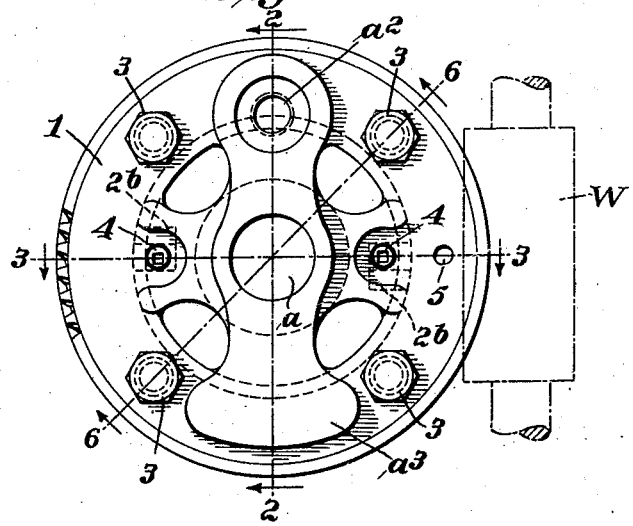
Figure 1 is a face view of the improved worm gear.

Referring by reference characters to this drawing, the numeral 1 designates the main body of the gear and 2 the circumferentially adjustable section. Said main section 1 has an offset portion $1^a$ at one side provided with a bore or cylindrical opening $a$ for shaft attachment and on the opposite side an axially alined opening $a'$ of a size sufficient to accommodate the shaft bearing, whereby the thrust of the gear is in the direct line of the bearing. The said main portion 1 has further an annular rebate $a''$ providing an internal annular wall $1^b$ which engages, with a sliding fit, the external face of an annular flange $2^a$ carried by the ring section 2.

The two parts or sections 1 and 2 are clamped firmly and rigidly together in their assembled condition by bolts 3 passing through alining openings in the respective parts, the openings of one or both of the sets being of larger diameter than the bolts to permit a limited amount of circumferential adjustment of the parts or sections relative to each other when the clamping bolts are loosened.

For effecting this circumferential adjustment without disassembly, the section 2 is provided with a pair of lugs $2^b$ having inclined faces $2^c$ which coact with the conical ends $4^a$ of screws 4 engaging threaded openings in the body member 1 on diametrically opposite sides of the center thereof. The cam faces $2^c$ are so positioned that inward movement of the screws on each side of the axis of the gear will cause their pointed ends to coact with the corresponding cam faces to secure circumferential adjustment of the section 2. By this means, extremely accurate adjustment of member or section 2 may be secured and thus all back lash removed without danger of binding of the gear teeth.

The worm with which the worm gear engages is shown conventionally at W.

To enable the parts to be properly and firmly positioned during the cutting of the gear teeth, I provide the sections with one or more sets of alined openings 5 in which an accurately fitting pin may be inserted temporarily for holding the parts rigidly against any relative circumferential adjustment.

Figure 2:
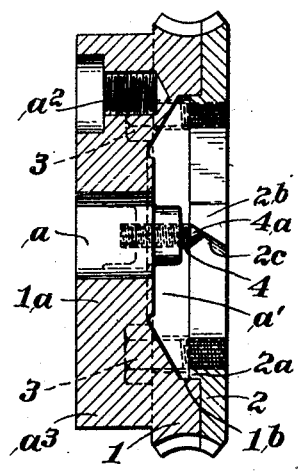
Fig. 2 is a section on line 2—2 of Fig. 1.
Figure 3:
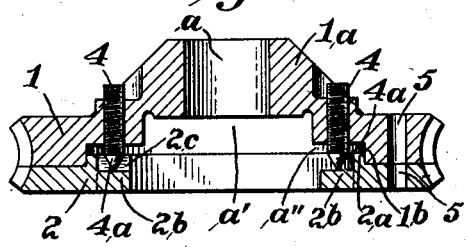
Fig. 3 is a section on line 3—3 of Fig. 1.
Figure 6:
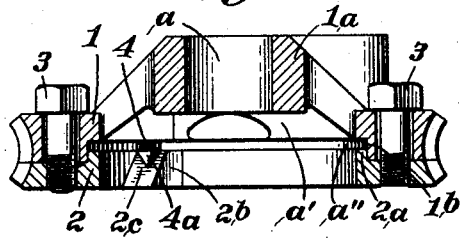
Fig. 6 is a section on line 6—6 of Fig. 1.
Figure 4:
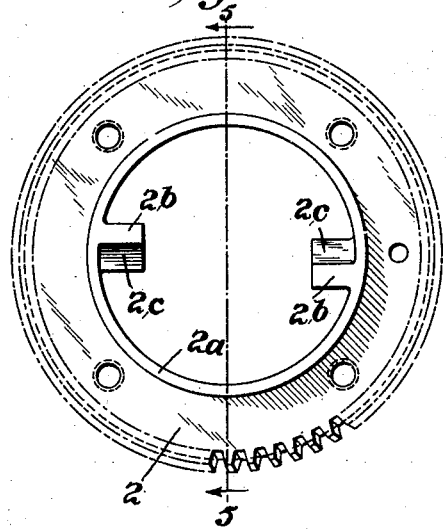
Fig. 4 is a plan view of the adjustable section detached.
Figure 5:
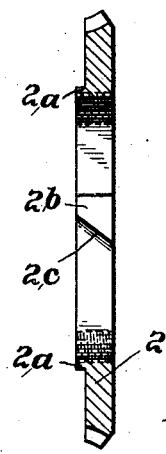
Fig. 5 is a section on line 5—5 of Fig. 4.

In order that the contact surface of the teeth used for transmitting power (teeth of section 1) may be as great as that of the conventional solid gear, I increase the throat angle of the gear and locate the split or division line between the sections at a material distance off center, as clearly shown in Figs. 2 and 3.

The present gear is designed more especially for actuating a reciprocating element, such as the pump piston of an automatic refrigerator and to this end the portion $1^a$ is shaped to receive a pitman connecting screw as at $a^2$ and at the other end to form a counterweight as at $a^3$.

Having thus described my invention, what I claim is:

A worm gear comprising a main section having an offset hub on one side and corresponding recess on the opposite side, the wall of said recess having an annular rebate forming a shoulder concentric to the axis, a circumferentially adjustable section having an annular flange engaging said shoulder, and having inwardly diametrically disposed lugs provided with inclined faces, screws passing through the main section and having conical ends engaging said inclined faces, and means for clamping said sections together.

In testimony whereof, I affix my signature.

PAUL H. BUCH.